(12) United States Patent
     Black

(10) Patent No.:    US 12,627,668 B2
(45) Date of Patent:        May 12, 2026

(54) ROLE-BASED ACCESS CONTROL RECOMMENDATION SYSTEMS

(71) Applicant: Google LLC, Mountain View, CA (US)

(72) Inventor:  James Paul Black, Sunnyvale, CA (US)

(73) Assignee: Google LLC, Mountain View, CA (US)

( * ) Notice:   Subject to any disclaimer, the term of this patent is extended or adjusted under 35 U.S.C. 154(b) by 91 days.

(21) Appl. No.: 18/659,254

(22) Filed:    May 9, 2024

(65)           Prior Publication Data

US 2025/0350602 A1      Nov. 13, 2025

(51) Int. Cl.
     H04L 29/06        (2006.01)
     H04L 9/40         (2022.01)
(52) U.S. Cl.
     CPC .......... H04L 63/101 (2013.01); H04L 63/104 (2013.01); H04L 63/20 (2013.01)
(58) Field of Classification Search
     CPC ... H04L 63/101; H04L 63/104; H04L 63/105; H04L 63/06; H04L 63/20; H04L 63/0263
     See application file for complete search history.

(56)           References Cited

U.S. PATENT DOCUMENTS

| 11,115,421 B2 | 9/2021 | Nevatia et al. | |
| 11,416,771 B2 | 8/2022 | Patil et al. | |
| 11,501,257 B2 | 11/2022 | Schornack et al. | |
| 12,107,874 B2 * | 10/2024 | Malhotra | G06F 21/554 |
| 12,238,119 B1 * | 2/2025 | Chivu | H04L 41/16 |

* cited by examiner

*Primary Examiner* — Longbit Chai
(74) *Attorney, Agent, or Firm* — Lowenstein Sandler LLP

(57)           ABSTRACT

A method for role-based access control recommendation includes obtaining one or more security logs from a security analytics platform. The method includes determining access rights to the one or more security logs for one or more users of the security analytics platform. The determining includes generating one or more clusters of security logs based on the one or more security logs. The determining includes providing, to a user of the security analytics platform, a recommendation for a first data access group for the security analytics platform based on a first cluster of the one or more clusters. The determining includes, responsive to input from the user of the security analytics platform, generating the first data access group for the security analytics platform based on the first cluster of the one or more clusters.

20 Claims, 6 Drawing Sheets

400

ROLE-BASED ACCESS CONTROL RECOMMENDATION SYSTEMS

TECHNICAL FIELD

The instant specification generally relates to computing devices. More specifically, the instant specification relates to role-based access control recommendation systems.

BACKGROUND

A security analytics platform can ingest data from computing resources (e.g., a computing system) in order to detect and respond to security threats on those computing resources. The ingested data can include event logs from devices and applications of the computing resources, network traffic data, or other data generated by or provided by the computing resources. The security analytics platform can then analyze the data, for example, by identifying patterns or anomalies in the data that can indicate a security threat for the computing resources.

SUMMARY

Disclosed herein are systems and methods for role-based access control recommendations. One aspect of the disclosure includes a method. The method includes obtaining one or more security logs from a security analytics platform. Each security log of the one or more security logs can indicate an action occurring on a computing system. Each security log of the one or more security logs may include one or more key-value pairs. The method includes determining access rights to the one or more security logs for one or more users of the security analytics platform. The determining can include generating one or more clusters of security logs based on at least a portion of the key-value pairs of the one or more security logs. The determining can include providing, to a user of the security analytics platform, a recommendation for a first data access group for the security analytics platform based on a first cluster of the one or more clusters. The first data access group may include data indicating a subset of the one or more security logs of the security analytics platform and a first subset of the one or more users to have access to the subset of the one or more security logs of the security analytics platform. The determining can include, responsive to input from the user of the security analytics platform, generating the first data access group for the security analytics platform based on the first cluster of the one or more clusters.

At least a portion of the key-value pairs of the one or more security logs may include a vendor key-value pair, a product key-value pair, a product type key-value pair, a business unit key-value pair, a geographic location key-value pair, or another type of key-value pair that can identify a first data access group. Obtaining the one or more security logs from the security analytics platform may include obtaining one or more event logs of the computing system.

The method may further include obtaining a second data access group from the security analytics platform. The second data access group may include a data access group generated using input of the user of the security analytics platform. The second data access group may include data indicating a second subset of users of the one or more users of the security analytics platform. Providing, to the user of the security analytics platform, the recommendation for the first data access group may include determining that a similarity metric indicates a dissimilarity regarding the first data access group and the second data access group above a threshold amount and alerting the user of the security analytics platform of a data access leak.

The method may further include performing a data access group size analysis on the first data access group. Performing the data access group size analysis on the first data access group may include obtaining a directory service forest of the computing system, comparing a size of the first subset of the one or more users of the security analytics platform to a size of a subset of the directory service forest, and responsive to the difference in the size of the first subset of the one or more users and the size of the subset of the directory service forest being above a threshold difference, modifying the first subset of the one or more users. Performing the data access group size analysis on the first data access group may include obtaining identity and access management (IAM) policy data of the computing system, comparing a size of the first subset of the one or more users of the security analytics platform to a size of a group of users of the IAM policy data, and responsive to the difference in the size of the first subset of the one or more users and the size of the subset of the data access group of the IAM policy data being above a threshold difference, modifying the first subset of the one or more users.

Another aspect of the disclosure includes a system. The system includes a memory and a processing device coupled to the memory. The processing device is configured to perform operations. The operations include obtaining one or more security logs from a security analytics platform. Each security log of the one or more security logs can indicate an action occurring on a computing system. Each security log of the one or more security logs may include one or more key-value pairs. The operations include determining access rights to the one or more security logs for one or more users of the security analytics platform. The determining can include generating one or more clusters of security logs based on at least a portion of the key-value pairs of the one or more security logs. The determining can include providing, to a user of the security analytics platform, a recommendation for a first data access group for the security analytics platform based on a first cluster of the one or more clusters. The first data access group may include data indicating a subset of the one or more security logs of the security analytics platform and a first subset of the one or more users to have access to the subset of the one or more security logs of the security analytics platform. The determining can include, responsive to input from the user of the security analytics platform, generating the first data access group for the security analytics platform based on the first cluster of the one or more clusters.

Another aspect of the present disclosure includes another method. The method includes obtaining one or more security logs from a security analytics platform. Each security log of the one or more security logs can indicate an action occurring on a computing system. Each security log of the one or more security logs may include one or more key-value pairs. The method includes determining access rights to the one or more security logs for one or more users of the security analytics platform. The determining can include obtaining a data access group of the security analytics platform. The determining can include selecting, based on the data access group, a subset of the one or more security logs of the security analytics platform. The determining can include generating one or more clusters based on at least a portion of the key-value pairs of the subset of the one or more security logs. The determining can include, responsive to the subset of the one or more security logs including one or more security logs belonging to different clusters of the one or more clusters, providing, to a user of the security analytics platform, a recommendation for a modification to the data access group of the security analytics platform.

The data access group may include a data access group generated using user input to the security analytics platform. The method may further include, responsive to input from the user of the security analytics platform, generating a data access group for the security analytics platform based on the data access group as modified by the recommendation. Obtaining the one or more security logs from the security analytics platform may include obtaining one or more event logs of the computing system.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
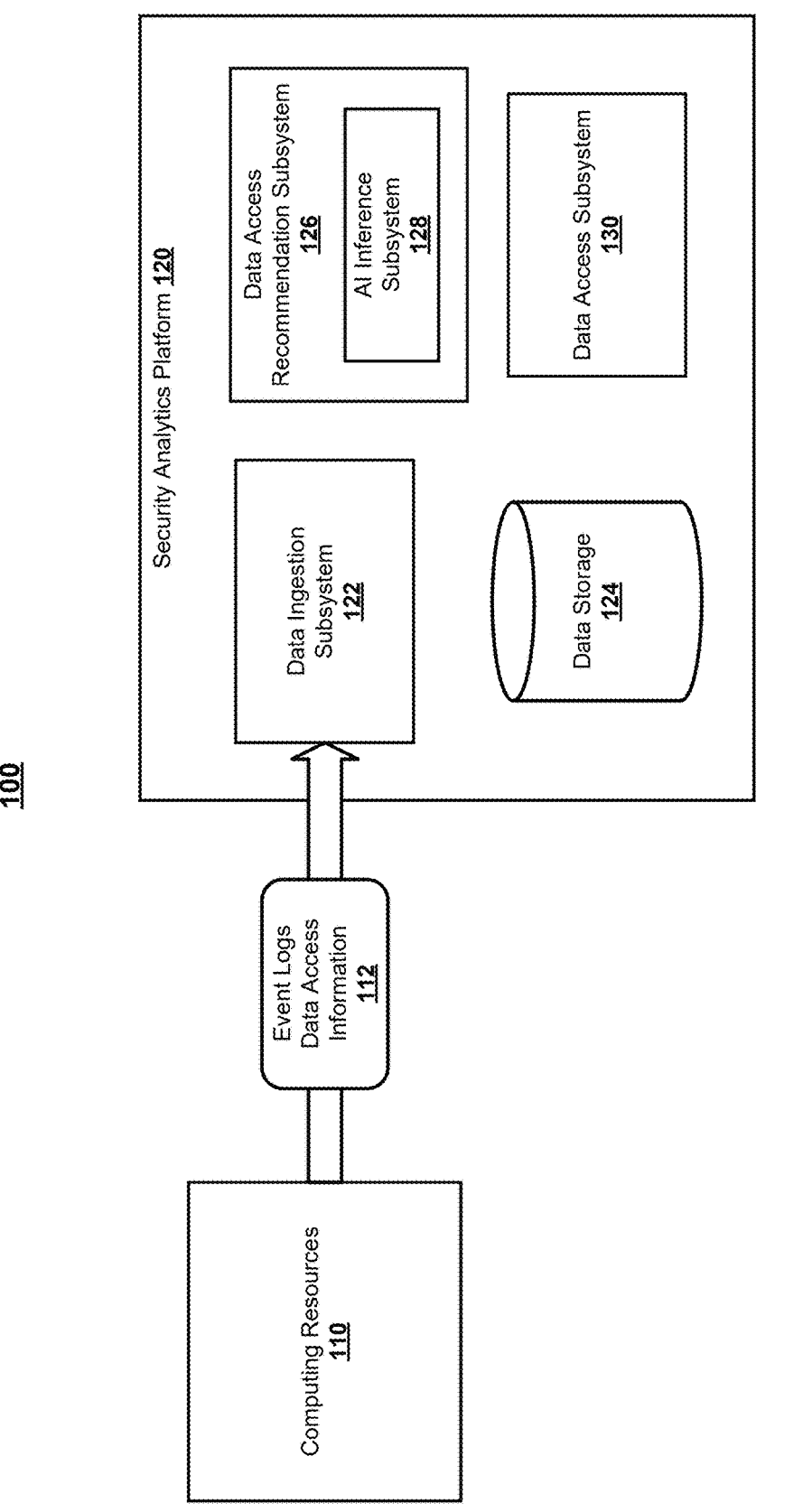
FIG. 1 schematically illustrates an example system for role-based access control recommendations in which some aspects of the present disclosure may be implemented, in accordance with various embodiments.

Computing resources-which can include computing devices, network devices, and other types of devices networked together, and software applications executing on these devices-generate data that are relevant to the security of the computing resources. Such data can include event logs (e.g., operating system events, errors generated by software applications, etc.), network traffic (e.g., emails, hypertext transfer protocol (HTTP) traffic, etc.), and other data pertaining to events that occur regarding the computing resources. A security analytics platform can analyze such data to detect and respond to security threats for the computing resources.

The security analytics platform may have multiple users that can access the security analytics platform to access the data ingested by the security analytics platform or the results of the platform's analysis of the data. However, not all users should have access to all of the data and results. Thus, the security analytics platform may provide data access controls that restrict access to some of the data and results for some users.

Conventional security analytics platform data access control mechanisms include applying a label to a piece of data in the security analytics platform and only allowing access to the piece of data by users of the platform who are approved to access data with that specific label. Unfortunately, this approach requires manually determining which data should be labeled with which labels, and determining which users should be able to access which labels. For computing resources that include many devices and a wide variety of software, this manual approach requires a lot of time and effort by users of the security analytics platform. Furthermore, this approach is also prone to human error because a user may incorrectly determine which data should be labeled or may incorrectly determine which users should access the labeled data.

Another conventional approach to security analytics data access controls may be to use the same or similar data access rules as those of the computing resources. For example, if a user of the computing resources has access to an email application of the computing resources, then the same user has access, on the security analytics platform, to the security logs of the platform that were generated based on data received by the platform from the email application. However, in some cases, the security analytics platform enriches the received data with data that the user should not have access to (e.g., the platform can add additional personally identifiable information to the email data), and thus, that user should not have access to the enriched data. If the user does have access to the enriched data, this may constitute a data leak.

Furthermore, the above approaches can result in some data being accessible by users of the security analytics platform that should not have access (which may result in a data leak) or may result in some data not being accessible by users of the platform that should have access (which may result in computer security personnel needing to frequently reconfigure the labels and/or users).

Aspects and implementations of the present disclosure address the above deficiencies, among others, by providing systems and methods that provide artificial intelligence (AI) role-based access control recommendations. A system of the present disclosure can obtain data from computing resources (e.g., event logs, data access information, etc.) and convert the data into security logs stored on the security analytics platform. The system can determine access rights to the security logs for one or more users of the platform by using a clustering-based AI model to generate clusters based on the security logs. The system can then generate a data access group based on a cluster of the generated clusters. The system can provide the recommendation to a user of the security analytics platform and implement the recommended data access group in response to user approval. In some implementations, the user has the option to modify the recommended data access group before the data access group is implemented. In one or more implementations, the system uses a generative AI model (e.g., a large language model (LLM)) in addition to or in place of the clustering-based AI model to generate the recommended data access group. In one implementation, the system uses the clustering-based AI model to analyze an already-existing data access group, determines that the data access group is misconfigured, and provides a recommendation to the user on how to modify the data access group to correct the misconfiguration.

Some benefits of the present disclosure may include providing a system that can use AI to generate data access groups instead of having a user manually generate the group. This increases the speed at which data access groups are created on the security analytics platform. This also results in higher quality data access groups that do not result in data leaks or need frequent reconfiguration.

In addition, some benefits of the present disclosure may provide a technical effect caused by or resulting from a technical solution to a technical problem. For example, one technical problem may relate to security analytics platforms that provide too wide of access to data for some users, which may result in a security leak. The present disclosure provides a technical solution by providing AI-generated data access groups that provide access to data on a security analytics platform that are tailored to similar security logs and, thus, do not result in data leaks.

FIG. 1 is a schematic block diagram illustrating an example system 100 for a role-based access control recommendation system in which one or more aspects of the present disclosure are implemented, in accordance with various embodiments. The system 100 may include computing resources 110. The system 100 may include various types of data access information 112 (event logs, data access information, etc.) provided by the computing resources 110 to a security analytics platform 120 of the system 100. The security analytics platform 120 may include a data ingestion subsystem 122, a data storage 124, a data access recommendation subsystem 126 (which may include an artificial intelligence (AI) inference subsystem 128), or a data access subsystem 130.

In one or more implementations, the computing resources 110 include a computing system. The computing resources 110 may include a computing system operated by a customer of the entity that operates the security analytics platform 120 and provides security analytics services to the customer. The computing resources 110 may include one or more servers. A server may include a computing device. In some implementations, a computing device includes a physical computing device or includes a virtualized component, such as a virtual machine (VM) or a container. A computing device may include an instance of a computing device. An instance of a computing device may include a spun-up instance that may not be specific to any computing device. In some implementations, a VM may include a system virtual machine, which may include a VM that emulates an entire physical computing device. A VM can include a process virtual machine, which may include a VM that emulates an application or some other software. A container may include a computing environment that logically surrounds one or more software applications independently of other applications executing on the computing resources 110.

The computing resources 110 may include one or more network devices. A network device may include a switch, router, hub, gateway, wireless access point, bridge, modem, repeater, or another type of network device. A network device may help provide data communication between the one or more servers, between other devices of the computing resources 110, or between a computing device external to the computing resources 110 and a device of the computing resources 110. The computing resources 110 may include one or more data storage devices. A data storage device may include a data store. One or more servers or other computing devices of the computing resources 110 can store data on the one or more data storage devices or retrieve data from the one or more data storage devices.

In one or more implementations, the computing resources 110 and the security analytics platform 120 are in data communication with each other over a data network. The data network may include a local area network (LAN), wide area network (WAN), a virtual private network (VPN), or some other data network. The data network may include network devices, including switches, routers, hubs, gateways, wireless access points, bridges, modems, repeaters, or other network devices.

In one implementation, the computing resources 110 and the security analytics platform 120 can execute on different computing systems. In other implementations, at least a portion of the computing resources 110 and the security analytics platform 120 can execute on the same computing system. The computing system may include a cloud computing system. A cloud computing system may include one or more computing devices (or portions of cloud computing devices) provided to an end user by a cloud provider. An end user of the environment may utilize a portion of the cloud computing system to host content for use or access by other parties or perform other computational tasks. In some implementations, the cloud computing system can be configured to allow the end user to use a portion of a computing device (e.g., only certain hardware, software, or other computer system resources). The cloud computing environment may include a private cloud, a public cloud, or a hybrid cloud. The cloud computing environment may provide infrastructure-as-a-service (IaaS), platform-as-a-service (PaaS), or software-as-a-service (SaaS) computing. The cloud computing environment can provide serverless computing.

In some implementations, the data access information 112 provided by the computing resources 110 includes one or more event logs. An event log may include a data record that represents an event related to a device or software of the computing resources 110. A device (including a component of a device) can generate the event log, or software can generate the event log. The event log may include data about the event represented by the event log. In some implementations, an event log includes a structured event log. A structured event log may include event data in a structured format. Event data in a structured format may include data that is organized into a recognized format. The structured event log may include event data in a Javascript Object Notation (JSON) format, an Extensible Mark-up Language (XML) format, a comma-separated values (CSV) format, or event data in some other structured format.

In one or more implementations, the data access information 112 includes data access information of the computing resources 110. The data access information may include data that indicates users of the computing resources 110 and what data of the computing resources 110 those users can access. The data access information 112 may include at least a portion of an directory service forest (or data describing at least a portion the directory service forest) of the computing resources 110. A directory service may include a directory service associated with the computing resources 110 that organizes domains, users, computing devices, or security policies of the computing resources 110, authenticates and authorizes the users and devices, and enforces the security policies. A directory service forest may include a logical container that includes the domains, users, computing devices, or security policies, their relationships to each other, their permissions for the computing resources 110, and other data.

In some implementations, the data access information 112 may include identity provider configuration data. An identity provider may include a service that creates, maintains, and manages identity information for users or entities that use the computing resources 110 and may provide authentication services to applications of the computing resources 110. The data access information 112 may include data indicating one or more users, user groups, or domains of the computing resources 110. The data access information 112 may include data indicating one or more access control policies of the computing resources 110. The data access information 112 may include one or more identity and access management (IAM) policies of the computing resources 110 (e.g., where the computing resources 110 include or are a part of a cloud computing system, the IAM policies of the computing resources 110 can include IAM policies of the cloud computing system's provider regarding the computing resources 110).

In some implementations, the data access information 112 includes additional types of data used by the computing resources 110. For example, the data access information 112 may include data loss prevention (DLP) data (e.g., data indicating that event logs from a certain device or certain software of the computing resources 110 include personally identifiable information (PII)). The data access information 112 may include data indicating which devices, software, data, or users of the computing resources 110 are designated as "high value." The data access information 112 may include results of a vulnerability analysis, penetration test, or other security information of the computing resources 110.

In some implementations, the security analytics platform 120 is a computing platform configured to obtain data from the computing resources 110 and analyze the data in order to detect and respond to security threats on the computing resources 110. The security analytics platform 120 may include a cloud computing system.

In implementations of the disclosure, a "user" can be represented as a single individual. However, other implementations of the disclosure encompass a "user" being an entity controlled by a set of users or an organization and/or an automated source such as a system or a platform. In situations in which the systems discussed here collect personal information about users, or can make use of personal information, the users can be provided with an opportunity to control whether the security analytics platform 120 collects user information (e.g., information about a user's social network, social actions or activities, profession, a user's preferences, or a user's current location), or to control whether and/or how to receive content from the security analytics platform 120 that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the security analytics platform 120.

In one implementation, the data ingestion subsystem 122 includes software configured to obtain the data access information 112 from the computing resources 110, convert at least a portion of the data access information 112 to a standardized format used by the security analytics platform 120, and store the data in the standardized format in the data storage 124. Because different portions of the data access information 112 may be in different formats, the data ingestion subsystem 122 can convert the data access information 112 into a standardized format used by the platform 120 so the platform 120 can efficiently analyze the converted data access information 112.

The standardized format may include one or more security logs of the platform 120. A security log may include one or more key-value pairs. A security log key may include data that indicates a category of data, and the corresponding value may include data that belongs to that category. The data ingestion subsystem 122 can perform one or more data enrichment operations to generate or modify a security log. For example, the data ingestion subsystem 122 can convert an event log from the computing resources 110 into a security log, and the data ingestion subsystem 122 can then enrich the security log by adding data to the security log based on one or more of the additional types of data discussed above. In some implementations, the data ingestion subsystem 122 does not convert at least a portion of the data access information 112 to a standardized format used by the platform 120 and can use the portion of the data access information 112, in its original format, as one or more security logs.

In one or more implementations, the data ingestion subsystem 122 can store one or more security logs in the data storage 124. The data storage 124 may include a physical storage medium that can include volatile storage (e.g., random access memory (RAM), etc.) or non-volatile storage (e.g., a hard disk drive (HDD), flash memory, etc.). The data storage 124 can include a file system, a database, or some other software configured to store data.

The data access recommendation subsystem 126 may include software configured to use one or more security logs to determine a data access group on the security analytics platform 120 based on the one or more security logs. The data access recommendation subsystem 126 can provide the data access group to a user of the platform 120, and in response to user input, can generate the data access group. The data access recommendation subsystem 126 can use one or more AI models of the AI inference subsystem 128 to group one or more security logs and generate a recommendation that the group of security logs be accessible by a data access group. The data access recommendation subsystem 126 can analyze existing data access groups of the security analytics platform 120 (e.g., data access groups created by users of the platform 120), compare the existing data access groups to data access groups generated by the data access recommendation subsystem 126, and alert a user of the platform 120 if an existing data access group includes users that the data access group should not, if the existing data access group does not include users that the data access group should, or if the data access group is otherwise misconfigured. A data access group of the security analytics platform 120 can include data indicating one or more users of the security analytics platform 120 and one or more security logs of the security analytics platform 120 that those one or more users have permission to access on the security analytics platform 120.

The AI inference subsystem 128 can include one or more AI models used to determine one or more data access groups for the security analytics platform 120. Details regarding the AI inference subsystem 128 and the one or more AI models are provided further below in relation to FIGS. 2-3.

In one implementation, the data access subsystem 130 includes software configured to enforce data access groups, data access policies, and other data access functionality of the security analytics platform 120. The data access subsystem 130 can receive a data access group recommendation from the data access recommendation subsystem 126 and can implement the data access group on the platform 120. In some implementations, the data access subsystem 130 generates a data access group responsive to user input to the platform 120.

Figure 2:
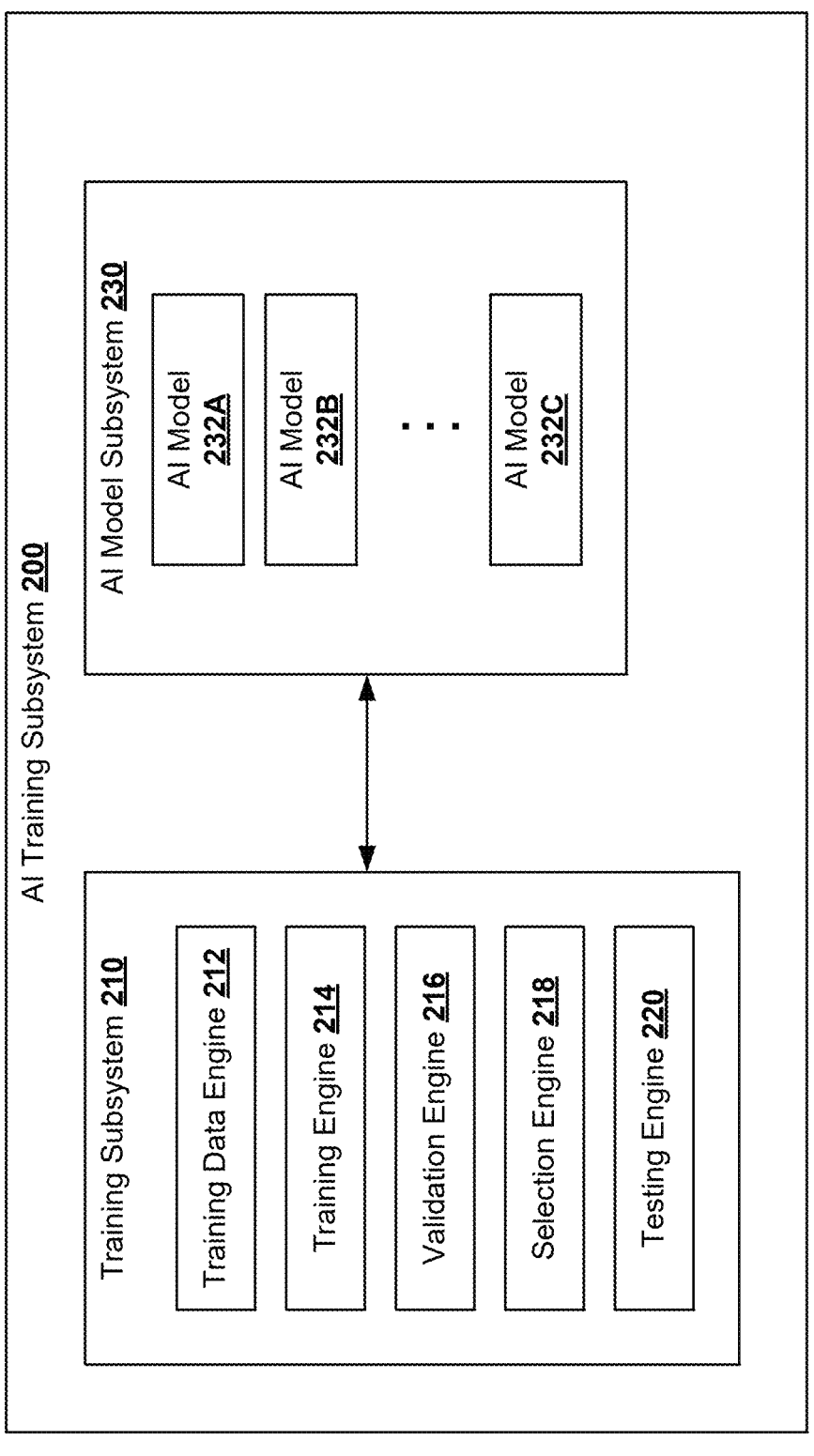
FIG. 2 schematically illustrates an artificial intelligence (AI) training subsystem for role-based access control recommendations in which some aspects of the present disclosure may be implemented, in accordance with various embodiments.

FIG. 2 illustrates an example AI training subsystem 200, in accordance with implementations of the present disclosure. As illustrated in FIG. 2, the AI training subsystem 200 can include a training subsystem 210, which may include a training data engine 212, a training engine 214, a validation engine 216, a selection engine 218, or a testing engine 220. The AI training subsystem 200 may include an AI model subsystem 230. The AI model subsystem 230 may include one or more AI models 232A-N.

In one implementation, the AI model 232 includes one or more artificial neural networks (ANNs), decision trees, random forests, support vector machines (SVMs), clustering-based models, Bayesian networks, or other types of machine learning models. ANNs generally include a feature representation component with a classifier or regression layers that map features to a target output space. The ANN can include multiple nodes ("neurons") arranged in one or more layers, and a neuron can be connected to one or more neurons via one or more edges ("synapses"). The synapses can perpetuate a signal from one neuron to another, and a weight, bias, or other configuration of a neuron or synapse can adjust a value of the signal. Training the ANN can include adjusting the weights or other features of the ANN based on an output produced by the ANN during training.

An ANN may include, for example, a convolutional neural network (CNN), recurrent neural network (RNN), or a deep neural network. A CNN, a specific type of ANN, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g., classification outputs). A deep network may include an ANN with multiple hidden layers or a shallow network with zero or a few (e.g., 1-2) hidden layers. Deep learning is a class of machine learning algorithms that use a cascade of multiple layers of nonlinear processing units for feature extraction and transformation. Each successive layer uses the output from the previous layer as input. An RNN is a type of ANN that includes a memory to enable the ANN to capture temporal dependencies. An RNN is able to learn input-output mappings that depend on both a current input and past inputs. The RNN will address past and future measurements and make predictions based on this continuous measurement information. One type of RNN that can be used is a long short term memory (LSTM) neural network.

ANNs can learn in a supervised (e.g., classification) or unsupervised (e.g., pattern analysis) manner. Some ANNs (e.g., such as deep neural networks) may include a hierarchy of layers, where the different layers learn different levels of representations that correspond to different levels of abstraction. In deep learning, each level learns to transform its input data into a slightly more abstract and composite representation.

In one implementation, an AI model 232 includes a generative AI model. A generative AI model can deviate from a machine learning model based on the generative AI model's ability to generate new, original data, rather than making predictions based on existing data patterns. A generative AI model can include a generative adversarial network (GAN), a variational autoencoder (VAE), or a large language model (LLM). In some instances, a generative AI model can employ a different approach to training or learning the underlying probability distribution of training data, compared to some machine learning models. For instance, a GAN can include a generator network and a discriminator network. The generator network attempts to produce synthetic data samples that are indistinguishable from real data, while the discriminator network seeks to correctly classify between real and fake samples. Through this iterative adversarial process, the generator network can gradually improve its ability to generate increasingly realistic and diverse data.

Generative AI models also have the ability to capture and learn complex, high-dimensional structures of data. One aim of generative AI models is to model underlying data distribution, allowing them to generate new data points that possess the same characteristics as training data. Some machine learning models (e.g., that are not generative AI models) focus on optimizing specific prediction of tasks.

In some implementations, an AI model 232 is an AI model that has been trained on a corpus of data. In some implementations, the AI model 232 can be a model that is first pre-trained on a corpus of data to create a foundational model, and afterwards fine-tuned on more data pertaining to a particular set of tasks to create a more task-specific, or targeted, model. The foundational model can first be pre-trained using a corpus of data that can include data in the public domain, licensed content, and/or proprietary content. Such a pre-training can be used by the AI model 232 to learn broad elements including, image or speech recognition, general sentence structure, common phrases, vocabulary, natural language structure, and other elements. In some implementations, this first, foundational model is trained using self-supervision, or unsupervised training on such datasets.

In some implementations, the AI model 232 is then further trained or fine-tuned on organizational data, including proprietary organizational data. The AI model 232 can also be further trained or fine-tuned on organizational data associated with security logs, data access groups, and other data access-related data.

In some implementations, the second portion of training, including fine-tuning, may be unsupervised, supervised, reinforced, or any other type of training. In some implementations, this second portion of training includes some elements of supervision, including learning techniques incorporating human or machine-generated feedback, undergoing training according to a set of guidelines, or training on a previously labeled set of data, etc. In a non-limiting example associated with reinforcement learning, the outputs of the AI model 232 while training can be ranked by a user, according to a variety of factors, including accuracy, helpfulness, veracity, acceptability, or any other metric useful in the fine-tuning portion of training. In this manner, the AI model 232 can learn to favor these and any other factors relevant to users when generating a response. Further details regarding training are provided below.

In some implementations, an AI model 232 includes one or more pre-trained models, or fine-tuned models. In a non-limiting example, in some implementations, the goal of the "fine-tuning" is accomplished with a second, or third, or any number of additional models. For example, the outputs of the pre-trained model can be input into a second AI model that has been trained in a similar manner as the "fine-tuned" portion of training above. In such a way, two more AI models can accomplish work similar to one model that has been pre-trained, and then fine-tuned.

As indicated above, an AI model 232 may be one or more generative AI models, allowing for the generation of new and original content. The generative AI model can use other machine learning models including an encoder-decoder architecture including one or more self-attention mechanisms, and one or more feed-forward mechanisms. In some implementations, the generative AI model includes an encoder that can encode input textual data into a vector space representation; and a decoder that can reconstruct the data from the vector space, generating outputs with increased novelty and uniqueness. The self-attention mechanism can compute the importance of phrases or words within a text data with respect to all of the text data. A generative AI model can also utilize the previously discussed deep learning techniques, including RNNs, CNNs, or transformer networks. Further details regarding generative AI models are provided herein.

In some implementations, different AI models 232 of the one or more AI models are different types of AI models. Multiple AI models 232 of the one or more AI models 232A-N can form an ensemble.

In one implementation, the training subsystem 210 manages the training and testing of the one or more AI models 232A-N. The training data engine 212 can generate training data (e.g., a set of training inputs and a set of target outputs) to train an AI model 232. In an illustrative example, the training data engine 212 can initialize a training set T to null. The training data engine 212 can generate training data using security logs, data access information, or other data access-related data on the security analytics platform 120 as training inputs and data access group data as target outputs. The training data engine 212 can add the training data to the training set T and can determine whether training set T is sufficient for training the AI model 232. The training set T can be sufficient for training the AI model 232 if the training set T includes a threshold amount of training data, in some implementations. In response to determining that the training set T is sufficient for training, the training data engine 212 can provide the training set T to the training engine 214.

The training engine 214 can train the AI model 232 using the training data (e.g., training set T). The AI model 232 can refer to the model artifact that is created by the training engine 214 using the training data, where such training data can include training inputs and, in some implementations, corresponding target outputs (e.g., correct answers for respective training inputs). The training engine 214 can input the training data into the AI model 232 so that the AI model 232 can find patterns in the training data and configure itself based on those patterns.

Where the AI model 232 uses supervised learning, the training engine 214 can assist the AI model 232 in determining whether the AI model 232 maps the training input to the target output (the answer to be predicted). Where the AI model 232 uses unsupervised learning, the training engine 214 can input the training data into the AI model 232. The AI model 232 can configure itself based on the input training data, but since the training data may not include a target output, the training engine 214 may not assist the AI model 232 in determining whether the AI model 232 provided a correct output during the training process.

The validation engine 216 may be capable of validating a trained AI model 232 using a corresponding set of features of a validation set from the training data engine 212. The validation engine 216 can determine an accuracy of each of the trained AI models 232A-N based on the corresponding sets of features of the validation set. Where the training data may not include a target output, validating a trained AI model 232 may include obtaining an output from the AI model 232 and providing the output to another entity for evaluation. The other entity may include another AI model configured to evaluate the output of the AI model that is undergoing training. The other entity may include a human. The validation engine 216 can discard a trained AI model 232 that has an accuracy that does not meet a threshold accuracy or that otherwise fails evaluation. In some implementations, the selection engine 218 is capable of selecting a trained AI model 232 that has an accuracy that meets a threshold accuracy. In some implementations, the selection engine 218 is capable of selecting the trained AI model that has the highest accuracy of multiple trained AI models 232A-N. In some implementations, the selection engine 218 obtains input from another AI model or a human and can select a trained AI model 232 based on the input.

The testing engine 220 may be capable of testing a trained AI model 232 using a corresponding set of features of a testing set from the training data engine 212. For example, a first trained AI model 232 that was trained using a first set of features of the training set can be tested using the first set of features of the testing set. The testing engine 220 can determine a trained AI model 232 that has the highest accuracy or other evaluation of all of the trained AI models 232A-N based on the testing sets.

In some implementations, the AI model subsystem 230 selects an AI model 232 from the one or more AI models 232A-N. Selecting an AI model 232 may include selecting the AI model 232 for training or for use. For example, the training subsystem 210 can provide data to the AI model subsystem 230 indicating which AI model 232 is to be trained. The AI model subsystem 230 can obtain data from a component of the security analytics platform 120 (e.g., the data access recommendation subsystem 126) indicating which AI model 232 to use to generate an output for the platform 120.

Figure 3:
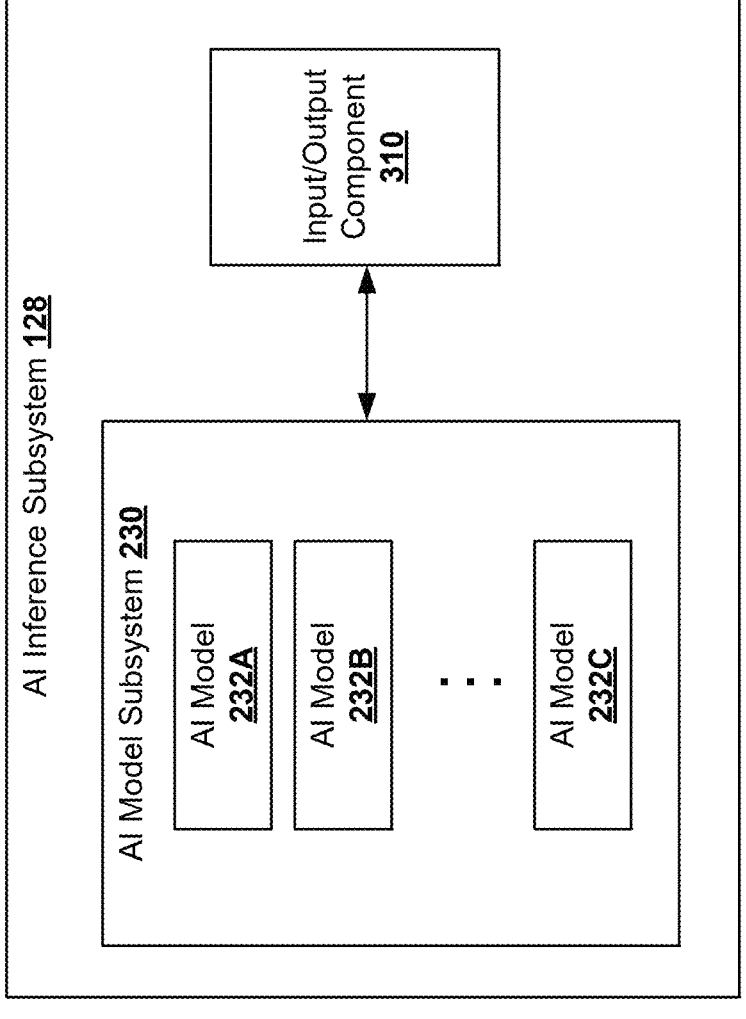
FIG. 3 schematically illustrates an AI inference subsystem for role-based access control recommendations in which some aspects of the present disclosure may be implemented, in accordance with various embodiments.

FIG. 3 depicts one implementation of an AI inference subsystem 128, in accordance with implementations of the present disclosure. The AI inference subsystem 128 may include the AI model subsystem 230, which may include one or more AI models 232A-N. The AI inference subsystem 128 may include an input/output component 310. The input/output component 310 may be configured to feed data as input to an AI model 232, obtain one or more outputs from the AI model 232, and provide the one or more outputs to another component (e.g., the data access recommendation subsystem 126). For example, in the present disclosure, the input/output component 310 may feed data access information 112 (e.g., security logs or other data access-related data) as input to the AI model 232 and obtain one or more outputs.

In some implementations, the AI inference subsystem 128 is not part of the data access recommendation subsystem 126 and may, instead, be part of another system or subsystem or be an independent system. In some implementations, the AI inference subsystem 128 includes the AI training subsystem 200.

Figure 4:
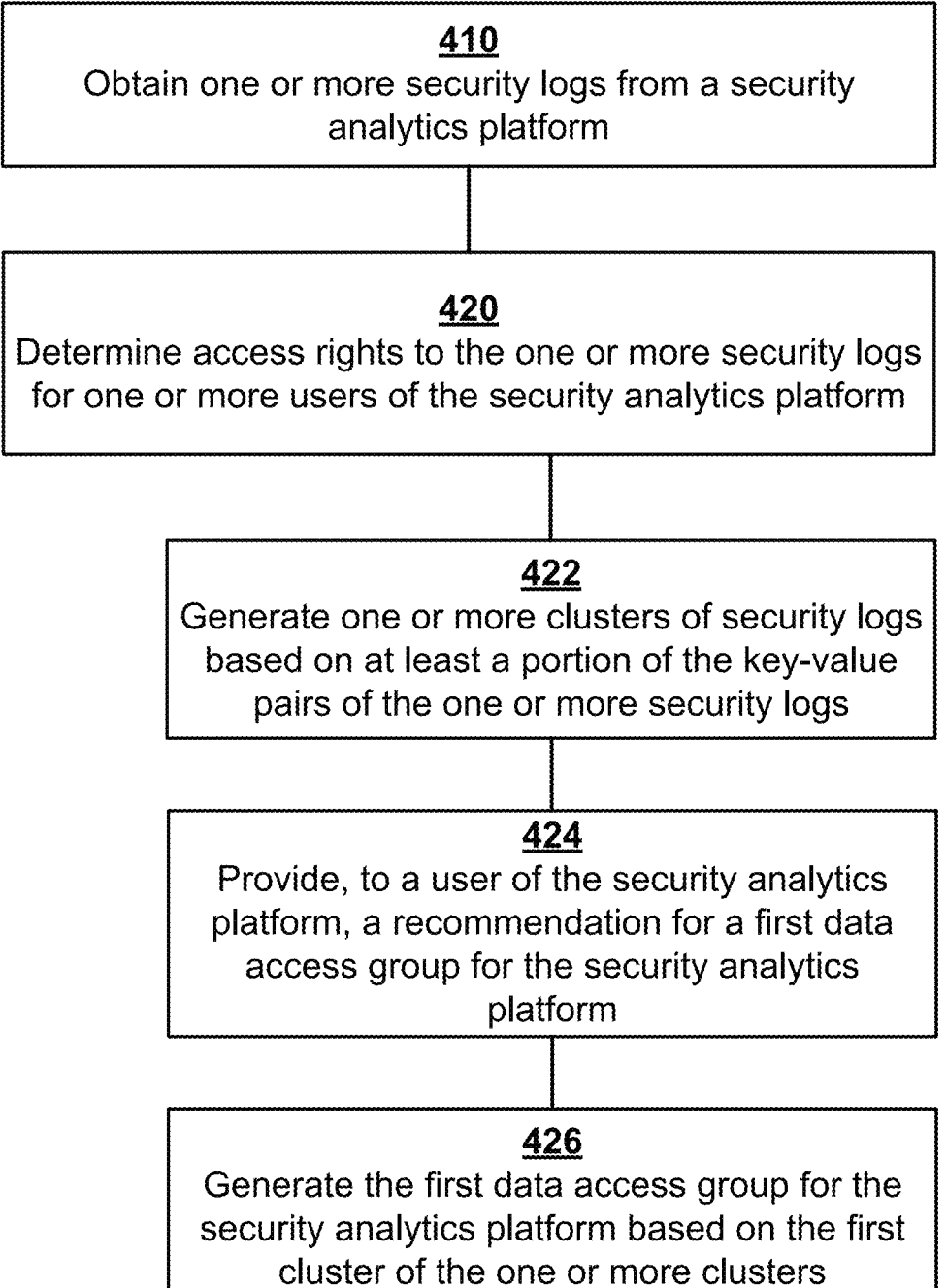
FIG. 4 depicts a flowchart illustrating an example method for role-based access control recommendations practicing some aspects of the present disclosure, in accordance with various embodiments.

FIG. 4 is a flowchart illustrating one embodiment of a method 400 for role-based access control recommendations, in accordance with some implementations of the present disclosure. A processing device, having one or more central processing units (CPU(s)) and/or memory devices communicatively coupled to the CPU(s) and/or graphics processing units (GPU(s)) can perform the method 400 and/or each of their individual functions, routines, subroutines, or operations. In certain implementations, a single processing thread can perform the method 400. Alternatively, two or more processing threads can perform the method 400, each thread executing one or more individual functions, routines, subroutines, or operations of the method. In an illustrative example, the processing threads implementing the method 400 can be synchronized (e.g., using semaphores, critical sections, and/or other thread synchronization mechanisms). Alternatively, the processing threads implementing the method 400 can be executed asynchronously with respect to each other. Various operations of the method 400 can be performed in a different (e.g., reversed) order compared with the order shown in FIG. 4. Some operations of the method 400 can be performed concurrently with other operations. Some operations can be optional. In some embodiments, the data access recommendation subsystem 126 performs the method 400.

At block 410, processing logic obtains one or more security logs from the security analytics platform 120. Each security log of the one or more security logs may indicate an action occurring on a computing system. Each security log may include one or more key-value pairs. A security log of the one or more security logs may include a security log as discussed above in relation to FIG. 1. The computing system may include the computing resources 110.

In one implementation, block 410 includes the data access recommendation subsystem 126 obtaining the one or more security logs. The data access recommendation subsystem 126 can obtain the one or more security logs from the data storage 124.

In some implementations, at least a portion of the key-value pairs of a security log includes a vendor key-value pair. A vendor key-value pair may include a key-value pair where the key indicates that the corresponding value specifies a vendor of the component that generated the event log on which the security log is based. For example, the vendor key-value pair may include "Vendor: Manufacturer A." At least a portion of the key-value pairs may include a product key-value pair. A product key-value pair may include a key-value pair where the key indicates that the corresponding value specifies a product name, model number, or the like of the component that generated the event log on which the security log is based. For example, the product key-value pair may include "Product: C71 Firewall." At least a portion of the key-value pairs may include a product type key-value pair. A product type key-value pair may include a key-value pair where the key indicates that the corresponding value specifies a type of product of the component that generated the event log on which the security log is based. For example, the product key-value pair may include "Product Type: Firewall."

In some implementations, at least a portion of the key-value pairs of a security log includes a business unit key-value pair. A business unit key-value pair may include a key-value pair where the key indicates that the corresponding value specifies a business unit that operates the component that generated the event log on which the security log is based. A business unit may include a division, suborganization, team, or the like of the entity that operates the computing resources 110. For example, the vendor key-value pair may include "Business Unit: Sales." In some implementations, at least a portion of the key-value pairs of a security log includes a geographic location key-value pair. A geographic location key-value pair may include a key-value pair where the key indicates that the corresponding value specifies a geographic location of the component that generated the event log on which the security log is based. For example, the vendor key-value pair may include "Location: California, USA."

In one or more implementations, at least a portion of the key-value pairs of a security log includes a security log namespace key-value pair, where the namespace value indicates a namespace for a network. At least a portion of the key-value pairs may include a cloud identifier key-value pair. A cloud identifier key-value pair may include a value that indicates a cloud resource such as an organization, folder, project, resource region, or a resource zone.

In some implementations, block 410 includes obtaining one or more event logs of the computing system (e.g., the computing resources 110). For example, as discussed above, the computing resources 110 can provide data access information 112 to the security analytics platform 120, and the data access information 112 may include one or more event logs. The data ingestion subsystem 122 can convert the one or more event logs to one or more security logs based on the one or more event logs.

At block 420, processing logic determines access rights to the one or more security logs for one or more users of the security analytics platform 120. Determining access rights to the one or more security logs may include determining which users of the security analytics platform 120 can access which security logs of the one or more security logs. Determining the access rights may include one or more operations, discussed below with respect to blocks 422, 424, and 426.

At block 422, processing logic generates one or more clusters of security logs. The clusters of security logs may be based on at least a portion of the key-value pairs of the one or more security logs of block 410.

In one implementation, the AI inference subsystem 128 of the data access recommendation subsystem 126 includes a clustering-based AI model 232. Processing logic can provide input data to the clustering-based AI model 232, which can generate a data point in the clustering dataspace based on that input data and/or determine to which cluster the data point belongs. In one implementation, each data point corresponds to a security log of the one or more security logs.

In one implementation, the input data includes the one or more security logs of block 410, and the AI model 232 can calculate where the data point corresponding to a security log should be placed in the clustering dataspace based on at least a portion of the key-value pairs of the security logs. The AI model 232 can then determine to which cluster the data point belongs. The AI model 232 can use k-means clustering, fuzzy clustering, or some other clustering algorithm.

In some implementations, the clustering algorithm that calculates where the data point should be placed in the clustering dataspace can weigh one or more key-value pairs more heavily than other key-value pairs. For example, the algorithm can weigh more heavily a vendor key-value pair, a product key-value pair, a product type key-value pair, a business unit key-value pair, or a geographic location key-value pair. The algorithm can weigh more heavily a security log namespace key-value pair, a cloud identifier key-value pair, or another type of key-value pair. The algorithm can weigh more heavily a key-value pair where the key is one of the most frequently used keys in security logs of the security analytics platform 120. The algorithm can weigh more heavily a key-value pair where the key is one of the least frequently used keys in security logs of the security analytics platform 120.

At block 424, processing logic provides, to a user of the security analytics platform, a recommendation for a first data access group for the security analytics platform. The recommendation may be based on a first cluster of the one or more clusters of block 422. The first data access group may include data indicating a subset of the one or more security logs. The first data access group may include data indicating a first subset of the one or more users of the security analytics platform 120. The first data access group may include the first subset of users having access to the subset of the one or more security logs of the security analytics platform 120.

In one implementation, the user that obtains the recommendation for the first data access group includes a user of the security analytics platform 120. The user may include a user of the entity that operates the computing resources 110. The user may include security operations personnel, information technology (IT) personnel, a systems administrator, or the like of the entity. The user may be using the security analytics platform 120 to generate or modify data access groups on the security analytics platform 120.

In some implementations, the subset of the one or more security logs may include the one or more security logs that form the first cluster. The subset of the one or more security logs may include other security logs.

In one or more implementations, the data access recommendation subsystem 126 can provide a visual representation of the first data access group to a UI of a client device of the user. The visual representation may include a visual representation of the subset of the one or more security logs. For example, the visual representation of the subset of the one or more security logs may include text displaying the one or more key-value pairs of one or more security logs. The visual representation may include a visual representation of the first subset of users that will have access to the subset of one or more security logs. The visual representation of the first subset of users may include a list of the users in the subset, and the list may include information about the users (e.g., usernames, full names, business unit, etc.).

At block 426, responsive to receiving input from the user of the security analytics platform 120, processing logic generates the first data access group for the security analytics platform 120 based on the first cluster of the one or more clusters. In one implementation, the UI discussed above may include text asking the user to approve the creation of the first data access group. The user may review the visual representation of the first data access group and may interact with a UI element (e.g., a button) to approve the creation of the first data access group. The input from the user may include the user's interaction with the UI element. The data access recommendation subsystem 126 can receive the user input and can provide the data indicating the first data access group to the data access subsystem 130. The data access recommendation subsystem 126 can provide a command to the data access subsystem 130 to generate the first data access group on the security analytics platform 120.

In some implementations, the user may provide input via the UI discussed above to modify the first data access group. Modifying the first data access group may include removing one or more users from the first data access group, adding one or more users of the security analytics platform 120 to the first data access group, removing one or more security logs from the first data access group, or adding one or more security logs to the first data access group.

In some implementations, block 420 further includes obtaining a second data access group from the security analytics platform 120. The second data access group may include a data access group that was generated using input of the user of the security analytics platform 120 (e.g., the same user of block 424). The input may include detailed input (e.g., data access group information) provided by the user of the security analytics platform 120. The second data access group may include a data access group that was not generated by the data access recommendation subsystem 126 but was generated in response to the user using conventional security analytics platform 120 functionality (e.g., manual creation of the second data access group). The second data access group may include data indicating a second subset of users of the one or more users of the security analytics platform 120. The second subset of users may be different than the first subset of users of block 424 (e.g., the second subset of users may include more, fewer, or different users than the first subset of users).

In one implementation, the data access recommendation subsystem 126 compares the first data access group to a second data access group created using data access group information provided by a user of the security analytics platform 120 in order to determine if the second data access group is misconfigured. Data access groups that are similar may indicate that one of the data access groups is misconfigured. The data access recommendation subsystem 126 can calculate a similarity metric based on the first data access group and the second data access group. The similarity metric may include a value indicating how similar or dissimilar the first data access group and the second data access group are. The similarity metric may be based on the first subset of users of the first data access group, the second subset of users of the second data access group, the subset of security logs of the first data access group, the subset of security logs of the second data access group, or other data indicated by the first data access group or the second data access group. In one or more implementations, block 424 includes the data access recommendation subsystem 126 determining that the similarity metric indicates a dissimilarity regarding the first data access group and the second data access group that is above a threshold amount. The threshold amount may include an amount indicated by configuration data of the data access recommendation subsystem 126, and the amount may have been provided by a user of the security analytics platform 120 or may have been calculated by the data access recommendation subsystem 126. Responsive to the determination that the similarity metric indicates a dissimilarity above the threshold amount, the data access recommendation subsystem 126 may alert the user of the security analytics platform 120 of a data access leak.

In one implementation, block 420 further includes performing a data access group size analysis on the first data access group. In some implementations, the data access recommendation subsystem 126 can perform the data access group size analysis.

Performing the data access group size analysis on the first data access group, in some implementations, includes obtaining a directory service forest of the computing system (e.g., the computing resources 110). For example, as discussed above, the data access information 112 obtained from the computing resources 110 may include a directory service forest. The data ingestion subsystem 122 can store the directory service forest in the data storage 124. The data ingestion subsystem 122 can convert the directory service forest into one or more security logs, each with a respective set of one or more key-value pairs. The data access recommendation subsystem 126 can compare a size of the first subset of the one or more users of the security analytics platform 120 to a size of a subset of the directory service forest. The subset of the directory service forest may include a user group, a domain, or another group of users indicated by the directory service forest or identity provider configuration data. Responsive to the difference in the size of the first subset of users and the size of the subset of the directory service forest being above a threshold difference, the data access recommendation subsystem 126 can modify the first subset of users of the first data access group. Modifying the first subset of users may include removing users from the first subset of users or adding users to the first subset of users. For example, responsive to the first subset of users being larger than the subset of the directory service forest, the data access recommendation subsystem 126 can remove users of the security analytics platform 120 from the first subset of users.

In one implementation, performing the data access group size analysis on the first data access group includes obtaining IAM policy data of the computing system (e.g., the computing resources 110) from the security analytics platform. For example, as discussed above, the data access information 112 obtained from the computing resources may include IAM policy data. The data ingestion subsystem 122 can store the IAM policy data in the data storage 124. The data ingestion subsystem 122 can convert the IAM policy data into one or more security logs, each with a respective set of one or more key-value pairs. The data access recommendation subsystem 126 can compare a size of the first subset of the one or more users of the security analytics platform 120 to a size of a group of users of the IAM policy data. Responsive to the difference in the size of the first subset of the one or more users and the size of the group of users of the IAM policy data being above a threshold difference, the data access recommendation subsystem 126 can modify the first subset of the one or more users.

In one implementation, performing the data access group size analysis on the first data access group includes determining whether the first data access group's subset of one or more security logs includes one or more security logs that include PII. Performing the data access group size analysis on the first data access group may include determining whether the first data access group's subset of one or more security logs includes one or more security logs based on event logs from "high value" components of the computing resources 110. In some implementations, the entity may restrict access to these types of security logs to a limited number of users of the security analytics platform 120. Thus, responsive to determining that the first data access group's subset of one or more security logs includes these types of security logs, the data access recommendation subsystem 126 can determine whether the size of the first subset of users of the first data access group is above a threshold amount. If the size is above the threshold amount, the data access recommendation subsystem 126 can remove one or more users from the first subset of users to reduce the size of the subset of users to the threshold amount or lower.

Figure 5:
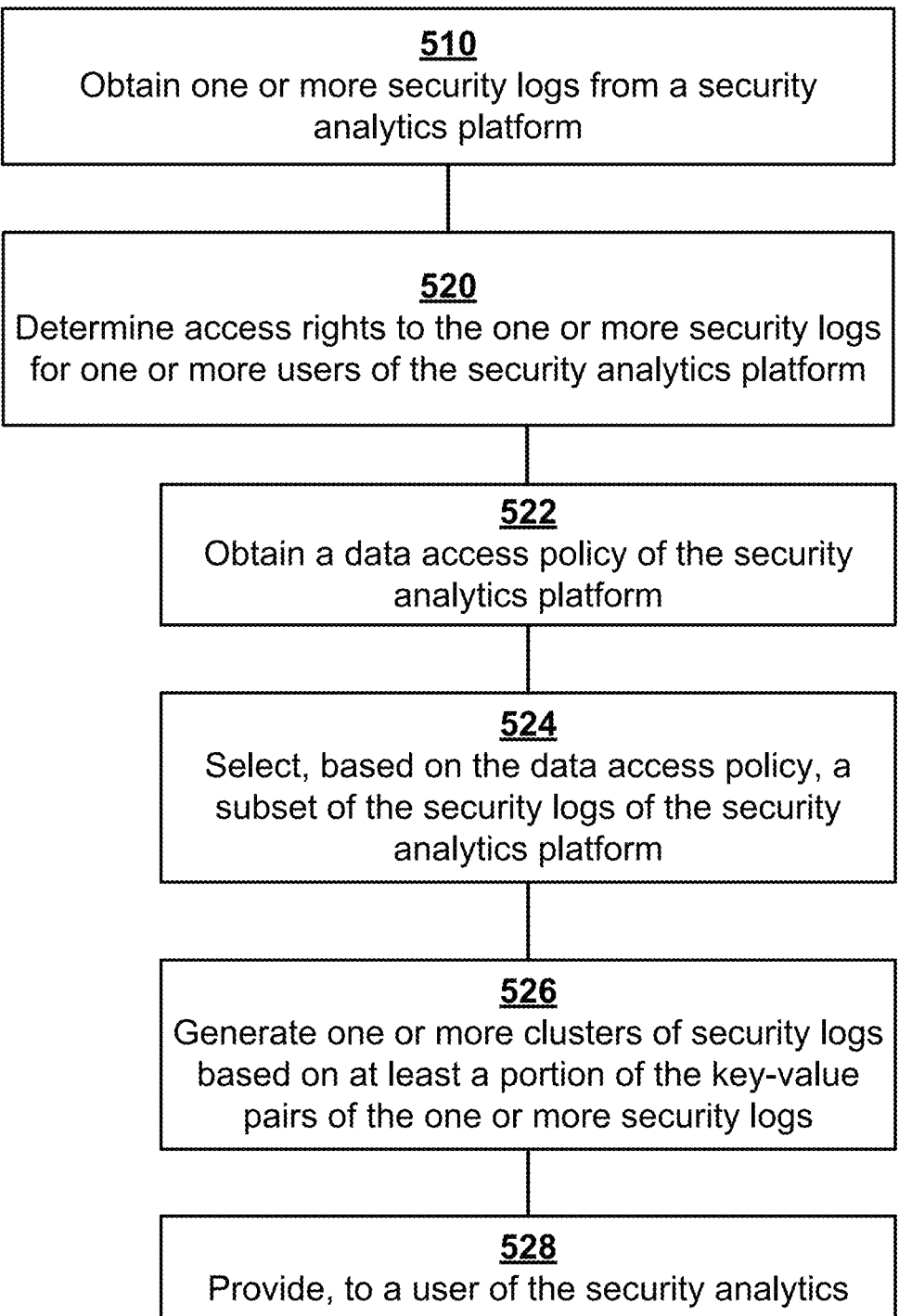
FIG. 5 depicts a flowchart illustrating another example method for role-based access control recommendations practicing some aspects of the present disclosure, in accordance with various embodiments.

FIG. 5 is a flowchart illustrating one embodiment of a method 500 for role-based access control recommendations, in accordance with some implementations of the present disclosure. A processing device, having one or more CPU(s) and/or memory devices communicatively coupled to the CPU(s) and/or GPU(s) can perform the method 500 and/or each of their individual functions, routines, subroutines, or operations. In certain implementations, a single processing thread can perform the method 500. Alternatively, two or more processing threads can perform the method 500, each thread executing one or more individual functions, routines, subroutines, or operations of the method. In an illustrative example, the processing threads implementing the method 500 can be synchronized (e.g., using semaphores, critical sections, and/or other thread synchronization mechanisms). Alternatively, the processing threads implementing the method 500 can be executed asynchronously with respect to each other. Various operations of the method 500 can be performed in a different (e.g., reversed) order compared with the order shown in FIG. 5. Some operations of the method 500 can be performed concurrently with other operations. Some operations can be optional. In some embodiments, the data access recommendation subsystem 126 performs the method 500.

At block 510, processing logic obtains one or more security logs from a security analytics platform 120. Each security log of the one or more security logs may indicate an action occurring on a computing system (e.g., the computing resources 110). Each security log of the one or more security logs may include one or more key-value pairs. Block 510 may include functionality similar to the functionality of block 410 of the method 400 of FIG. 4.

At block 520, processing logic determines access rights to the one or more security logs for one or more users of the security analytics platform 120. Block 520 may include one or more operations discussed below.

At block 522, processing logic obtains a data access group of the security analytics platform 120. In some implementations, the data access group includes a data access group generated by user input to the security analytics platform 120. A data access group generated by user input may include a data access group that was not generated by the data access recommendation subsystem 126. In one or more implementations, the data access group may include a data access group generated by the data access recommendation subsystem 126 (e.g., generated according to the method 400).

At block 524, processing logic selects, based on the data access group, a subset of the one or more security logs of the security analytics platform 120. For example, as discussed above, a data access group of the security analytics platform 120 may include data indicating one or more users of the security analytics platform 120 and one or more security logs of the security analytics platform 120 that those one or more users have permission to access on the security analytics platform 120. The subset of the one or more security logs may, therefore, include the one or more security logs of the security analytics platform 120 that the users of the data access group have access to.

At block 526, processing logic generates one or more clusters based on at least a portion of the key-value pairs of the subset of the one or more security logs. Block 526 may include functionality similar to the functionality of block 422 of the method 400.

At block 528, processing logic can determine whether the subset of one or more security logs includes one or more security logs belonging to different clusters of the one or more clusters. Security logs belonging to different clusters may indicate that the data access group was misconfigured. Responsive to determining that the subset of one or more security logs includes one or more security logs belonging to different clusters, processing logic provides, to a user of the security analytics platform, a recommendation for a modification to the data access group of the security analytics platform 120. The user may request that the security analytics platform 120 modify the data access group based on the recommendation.

As an example, at block 522, the data access recommendation subsystem 126 can obtain a data access group of the security analytics platform 120. The data access group may include a data access group manually generated by a user of the security analytics platform 120 (e.g., the data access group may not have been generated according to the method 400). At block 524, the data access recommendation subsystem 126 can select one or more security logs indicated by the data of the data access group. For example, the data access group may indicate that a first group of users of the security analytics platform 120 have access to a first subset of the security logs of the security analytics platform 120. Thus, the data access recommendation subsystem 126 can select the first subset of security logs. In this example, the first subset of security logs may include 1,000 security logs.

Continuing the example, at block 526, the data access recommendation subsystem 126 can use the AI inference subsystem 128 to generate one or more clusters based on the first subset of security logs. The AI inference subsystem 128 can generate two clusters: a first cluster with 900 security logs and a second cluster with 100 security logs. At block 528, the data access recommendation subsystem 126 can determine that the first subset of security logs includes one or more security logs belonging to different clusters. In response, the data access recommendation subsystem 126 can provide, to a user of the security analytics platform 120, a recommendation for a modification to the data access group. In this example, the recommendation may include the recommendation to remove the 100 security logs belonging to the second cluster from the data access group. The data access recommendation subsystem 126 can present to the user, on a UI, a visual representation of the recommended modification, which may include text asking the user to approve the modification of the data access group. The user may review the visual representation of the modification and may interact with a UI element (e.g., a button) to approve the modification. The data access recommendation subsystem 126 can receive the user input and can provide the data indicating the modification to the data access subsystem 130. The data access recommendation subsystem 126 can provide a command to the data access subsystem 130 to modify the data access group on the security analytics platform 120.

As indicated above, in some implementations, the AI model 232 includes an LLM. In some implementations, the LLM includes generative AI functionality. In such implementations, the AI model 232 generates new content based on provided input data (e.g., security logs). In some implementations, the LLM is configured to generate a data access group.

The AI training subsystem 200 can be configured to train the LLM. It should be noted that the AI training subsystem 200 can train an LLM in accordance with implementations described herein or in accordance with other techniques for training LLMs. For example, an LLM may be trained on a large amount of data, including prediction of one or more missing words in a sentence, identification of whether two consecutive sentences are logically related to each other, generation of next texts based on prompts, etc. In some implementations, the AI training subsystem 200 is configured to train an LLM on a corpus of data that includes data access groups.

The generative AI model 232 can be supported by a prompt subsystem, which may reside on the security analytics platform 120. The prompt subsystem can enable a user or a component of the platform 120 to access the generative AI model 232. The prompt subsystem can be configured to perform automated identification of, and facilitate retrieval of, relevant and timely contextual information for efficient and accurate processing of prompts by the AI model 232. Communications between the prompt subsystem and the input/output component 310 can be facilitated by a generative model application programming interface (API), in some implementations. Communications between the prompt subsystem and the data access recommendation subsystem 126 can be facilitated by a data management API. In additional or alternative implementations, the generative model API translates prompts generated by the prompt subsystem into unstructured natural-language format and, conversely, translate responses received from the AI model 232 into any suitable form (e.g., including any structured proprietary format as may be used by the prompt subsystem). Similarly, the data management API can support instructions that may be used to communicate data requests to the data access recommendation subsystem 126 and formats of data received from such components.

As indicated above, a user can interact with the prompt subsystem via a prompt interface. The prompt interface may include a UI element that can support any suitable types of user inputs (e.g., textual inputs, speech inputs, image inputs, etc.). The UI element can further support any suitable types of outputs (e.g., textual outputs, speech outputs, image outputs, etc.). In some implementations, the UI element is a web-based UI element, a mobile application-supported UI element, or any combination thereof. The UI element includes selectable items that, in some implementations, enables a user to select from multiple generative AI models 232A-N. The UI element can allow the user to provide consent for the prompt subsystem or the generative AI model 232 to access user data or other data associated with a client device stored in the data storage 124, process, or store new data received from the user, and the like. The UI element can additionally or alternatively allow the user to withhold consent to provide access to user data. In some implementations, user input entered using the UI element is communicated to the prompt subsystem by a user API. The user API can be located at the client device of the user accessing the query tool.

In some implementations, the prompt subsystem includes a prompt analyzer to support various operations of this disclosure. For example, the prompt analyzer can receive an input (e.g., a prompt submitted by a user of or component of the security analytics platform 120 and generate one or more intermediate prompts to the generative AI model 232 to determine what type of data the generative AI model may need to successfully respond to the input. Upon receiving a response from the generative AI model 232, the prompt analyzer can analyze the response, form a request for relevant contextual data for the data storage 124, which can then supply such data. The prompt analyzer can then generate a prompt to the generative AI model 232 that includes the original prompt and the contextual data. In some implementations, the prompt analyzer, itself, includes a lightweight generative AI model that can process the intermediate prompt(s) and determine what type of contextual data may be needed by the generative AI model 232 together with the original prompt to ensure a meaningful response from generative AI model 232.

The prompt subsystem may include (or may have access to) instructions stored on one or more tangible, machine-readable storage media of a computing device (e.g., a computing device of the security analytics platform 120) and executable by one or more processing devices of the computing device. In one implementation, the prompt subsystem is implemented on a single machine. In some implementations, the prompt subsystem is a combination of a client component and a server component. In some implementations, the prompt subsystem is executed entirely on a client device Alternatively, some portion of the prompt subsystem may be executed on a client computing device while another portion of the query tool may be executed on a server machine.

In one implementation, a user of the security analytics platform 120 can submit a prompt using the prompt subsystem. The prompt may include a command to generate a data access group. The prompt may include one or more configurations for the data access group. For example, the prompt may include the text, "Create a data access group for network sensor data without sharing PII." The prompt subsystem can receive the prompt. The prompt subsystem can obtain context data to include with the prompt when the prompt subsystem provides the prompt to the LLM. The context data may include one or more security logs from the data storage 124.

The prompt subsystem can provide the prompt and the context data to the LLM of the AI inference subsystem 128. The LLM can use the prompt to generate the data access group. The AI inference subsystem 128 can provide the data access group to the data access recommendation subsystem 126. The data access recommendation subsystem 126 can provide, to the user of the platform 120, a visual representation of the data access group generated by the LLM on a UI, as discussed above. In one implementation, the UI may include text asking the user to approve the creation of the data access group. The user may review the visual representation of the data access group and may interact with a UI element (e.g., a button) to approve the creation of the data access group. The data access recommendation subsystem 126 can receive the user input and can provide the data indicating the data access group to the data access subsystem 130. The data access recommendation subsystem 126 can provide a command to the data access subsystem 130 to generate the first data access group on the security analytics platform 120. In some implementations, the user may cause modification to the data access group before approving creation of the modified data access group.

Figure 6:
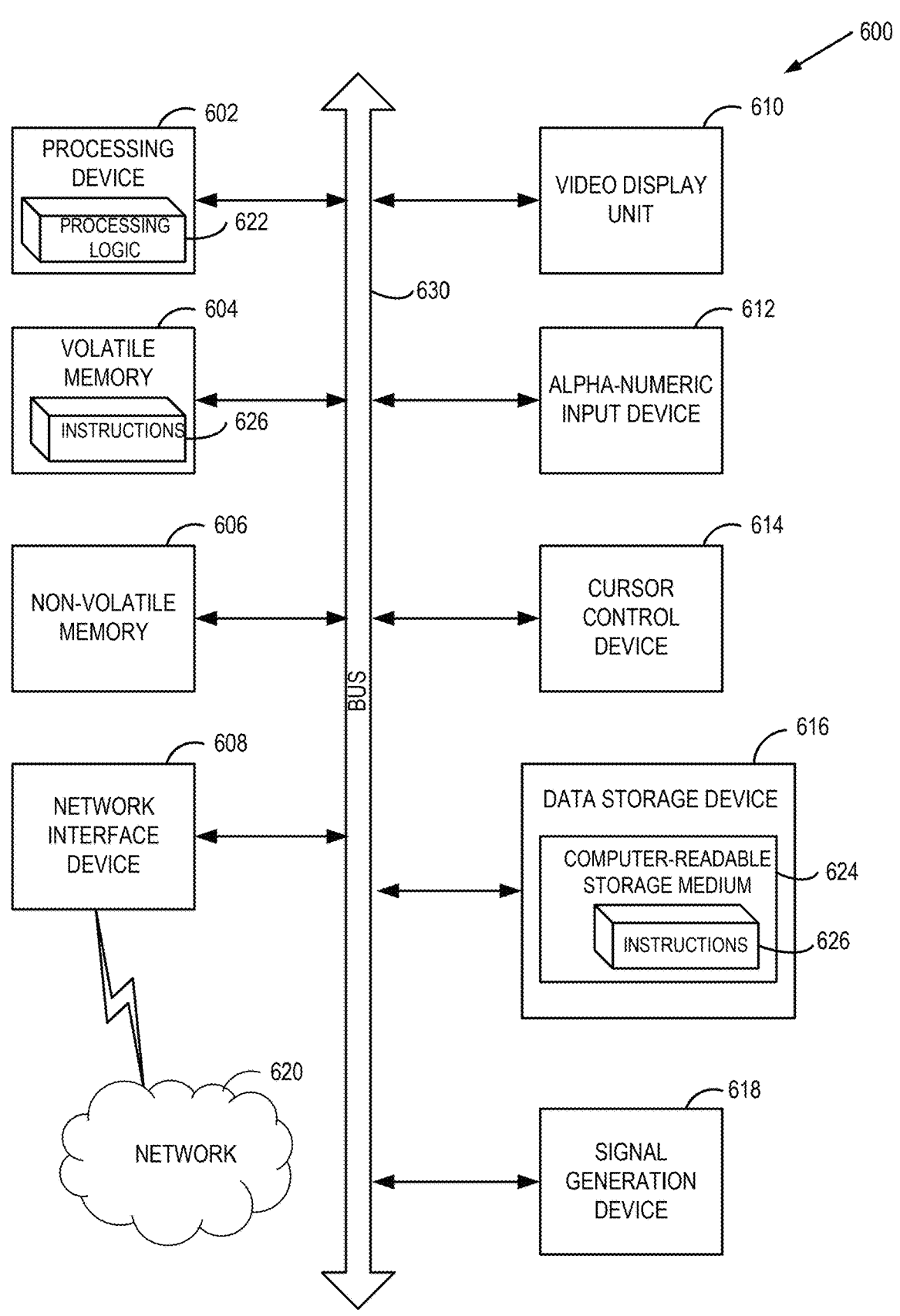
FIG. 6 depicts a block diagram of a computer device capable of role-based access control recommendations, in accordance with some implementations of the present disclosure.

FIG. 6 is a block diagram illustrating an example computer system 600, in accordance with implementations of the present disclosure. The computer system can be a computing device or other device discussed herein. The computer system 600 can be a computing device of the computing resources 110, the security analytics platform 120, the data ingestion subsystem 122, the data storage 124, the data access recommendation subsystem 126, the AI inference subsystem 128, or the data access subsystem 130 of FIG. 1. The computer system 600 can be the AI training subsystem 200, the training subsystem 210, or the AI model subsystem 230 of FIG. 2. The computer system 600 can operate in the capacity of a server or an endpoint machine in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a volatile memory 604 (e.g., read-only memory (ROM), flash memory, dynamic random access memory (DRAM) such as synchronous DRAM (SDRAM), double data rate (DDR SDRAM), or DRAM (RDRAM), etc.), a non-volatile memory 606 (e.g., flash memory, static random access memory (SRAM), etc.), and a data storage device 616, which communicate with each other via a bus 630.

The processing device 602 represents one or more general-purpose processing devices such as a microprocessor, CPU, GPU, or the like. More particularly, the processing device 602 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 can also be one or more special-purpose processing devices such as an ASIC, a field programmable gate array (FPGA), a digital signal processor (DSP), network processor, or the like. The processing device 602 is configured to execute instructions 626 (e.g., for performing one or more of the methods 400 or 500) for performing the operations discussed herein.

The computer system 600 can further include a network interface device 608. The network interface device 608 can assist in data communication between computing devices. The computer system 600 also can include a video display unit 610 (e.g., a liquid crystal display (LCD) or a cathode ray tube (CRT)), an input device 612 (e.g., a keyboard, and alphanumeric keyboard, a motion sensing input device, touch screen), a cursor control device 614 (e.g., a mouse), and a signal generation device 618 (e.g., a speaker).

The data storage device 616 can include a non-transitory machine-readable storage medium 624 (also computer-readable storage medium) on which is stored one or more sets of instructions 626 (e.g., for role-based access control recommendation and other functionality disclosed herein) embodying any one or more of the methodologies or functions described herein. The instructions 626 can also reside, completely or at least partially, within the volatile memory 604 and/or within the processing device 602 during execution thereof by the computer system 600, the volatile memory 604 and the processing device 602 also constituting machine-readable storage media. The instructions 626 can further be transmitted or received over a network 620 via the network interface device 608.

In one implementation, the instructions 626 include instructions for role-based access control recommendation. While the computer-readable storage medium 624 (machine-readable storage medium) is shown in an example implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "obtaining", "generating", "providing", "alerting", "modifying", "determining", "performing", "comparing", "selecting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods 400 and 500 are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation," "an implementation," "some implementations," "one embodiment," "an embodiment," or "some embodiments" mean that a particular feature, structure, or characteristic described in connection with the implementation or embodiment is included in at least one implementation or embodiment. Thus, the appearances of the phrase "in one implementation" or "in an implementation" or other similar terms in various places throughout this specification are not necessarily all referring to the same implementation. In addition, the term "or" is intended to mean an inclusive "or" rather than an exclusive "or." Moreover, the word "example" or a similar term are used herein to mean serving as an example, instance, or illustration. Any aspect or design described herein as an "example" is not necessarily to be construed as preferred or advantageous over other aspects or designs. Rather, use of the word "example" or a similar term is intended to present concepts in a concrete fashion.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method to provide access group recommendations, comprising:

obtaining a plurality of security logs from a security analytics platform, wherein:

each security log of the plurality of security logs indicates an action occurring on a computing system, and each security log of the plurality of security log comprises a plurality of key-value pairs; and determining access rights to the plurality of security logs for a plurality of users of the security analytics platform, wherein the plurality of users include a first subset of the plurality of users having access to a first subset of the plurality of security logs, and wherein the determining comprises:

generating a plurality of clusters of security logs based on at least a portion of the key-value pairs of the plurality of security logs, providing, to a user of the security analytics platform, a recommendation for a first data access group for the security analytics platform based on a first cluster of the plurality of clusters, wherein the first data access group comprises data indicating the first subset of the plurality of security logs of the security analytics platform and the first subset of the plurality of users to have access to the subset of the plurality of security logs of the security analytics platform, and responsive to user input indicating approval of the user of the security analytics platform, generating the first data access group for the security analytics platform based on the first cluster of the plurality of clusters.

2. The method of claim 1, wherein the at least a portion of the key-value pairs of the plurality of security logs comprises at least one of:

a vendor key-value pair;

a product key-value pair; or a product type key-value pair.

3. The method of claim 1, wherein the at least a portion of the key-value pairs of the plurality of security logs comprises at least one of:

a business unit key-value pair; or a geographic location key-value pair.

4. The method of claim 1, wherein obtaining the plurality of security logs from the security analytics platform comprises obtaining one or more event logs of the computing system.

5. The method of claim 1, further comprising obtaining a second data access group from the security analytics platform, wherein:

the second data access group includes a data access group generated using input of the user of the security analytics platform; and the second data access group includes data indicating a second subset of users of the plurality of users of the security analytics platform.

6. The method of claim 5, wherein providing, to the user of the security analytics platform, the recommendation for the first data access group comprises:

determining that a similarity metric indicates a dissimilarity regarding the first data access group and the second data access group above a threshold amount; and alerting the user of the security analytics platform of a data access leak.

7. The method of claim 1, further comprising performing a data access group size analysis on the first data access group.

8. The method of claim 7, wherein performing the data access group size analysis on the first data access group comprises:

obtaining a directory service forest of the computing system;

comparing a size of the first subset of the plurality of users of the security analytics platform to a size of a subset of the directory service forest; and responsive to a difference in the size of the first subset of the plurality of users and the size of the subset of the directory service forest being above a threshold difference, modifying the first subset of the plurality of users.

9. The method of claim 7, wherein performing the data access group size analysis on the first data access group comprises:

obtaining identity and access management (IAM) policy data of the computing system;

comparing a size of the first subset of the plurality of users of the security analytics platform to a size of a group of users of the IAM policy data; and responsive to a difference in the size of the first subset of the plurality of users and the size of the subset of the data access group of the IAM policy data being above a threshold difference, modifying the first subset of the plurality of users.

10. A system to provide access group recommendations, comprising:

a memory; and a processing device, coupled to the memory, configured to perform operations, comprising:

obtaining a plurality of security logs from a security analytics platform, wherein:

each security log of the plurality of security logs indicates an action occurring on a computing system, and each security log of the plurality of security log comprises a plurality of key-value pairs; and determining access rights to the plurality of security logs for a plurality of users of the security analytics platform, wherein the plurality of users include a first subset of the plurality of users having access to a first subset of the plurality of security logs, and wherein the determining comprises:

generating a plurality of clusters of security logs based on at least a portion of the key-value pairs of the plurality of security logs, providing, to a user of the security analytics platform, a recommendation for a first data access group for the security analytics platform based on a first cluster of the plurality of clusters, wherein the first data access group comprises data indicating the first subset of the plurality of security logs of the security analytics platform and the first subset of the plurality of users to have access to the subset of the plurality of security logs of the security analytics platform, and responsive to user input indicating approval of the user of the security analytics platform, generating the first data access group for the security analytics platform based on the first cluster of the plurality of clusters.

11. The system of claim 10, wherein the at least a portion of the key-value pairs of the plurality of security logs comprises at least one of:

a vendor key-value pair;

a product key-value pair; or a product type key-value pair.

12. The system of claim 10, wherein the at least a portion of the key-value pairs of the plurality of security logs comprises at least one of:

a business unit key-value pair; or a geographic location key-value pair.

13. The system of claim 10, wherein obtaining the plurality of security logs from the security analytics platform comprises obtaining one or more event logs of the computing system.

14. The system of claim 10, wherein the operations further comprise obtaining a second data access group from the security analytics platform, wherein:

the second data access group includes a data access group generated using input of the user of the security analytics platform; and the second data access group includes data indicating a second subset of users of the plurality of users of the security analytics platform.

15. The system of claim 14, wherein the operation of providing, to the user of the security analytics platform, the recommendation for the first data access group comprises:

determining that a similarity metric indicates a dissimilarity regarding the first data access group and the second data access group above a threshold amount; and alerting the user of the security analytics platform of a data access leak.

16. The system of claim 10, wherein the operations further comprise performing a data access group size analysis on the first data access group.

17. A method to provide access group recommendations, comprising:

obtaining a plurality of security logs from a security analytics platform, wherein:

each security log of the plurality of security logs indicates an action occurring on a computing system, and each security log of the plurality of security logs comprises a plurality of key-value pairs; and determining access rights to the plurality of security logs for a plurality of users of the security analytics platform, wherein the plurality of users of the security analytics platform have access to a subset of the plurality of security logs, and wherein the determining comprises:

obtaining a first data access group of the security analytics platform, selecting, based on the first data access group, the subset of the plurality of security logs of the security analytics platform, generating a plurality of clusters based on at least a portion of the key-value pairs of the subset of the plurality of security logs, and responsive to the selected subset of the plurality of security logs including one or more security logs belonging to different clusters that differ from a first cluster of the plurality of clusters, providing, to a user of the security analytics platform, a recommendation for a modification to the first data access group of the security analytics platform.

18. The method of claim 17, wherein the data access group comprises a data access group generated using user input to the security analytics platform.

19. The method of claim 17, further comprising, responsive to input from the user of the security analytics platform, generating a data access group for the security analytics platform based on the first data access group as modified by the recommendation.

20. The method of claim 17, wherein obtaining the plurality of security logs from the security analytics platform comprises obtaining one or more event logs of the computing system.

\* \* \* \* \*